Fig. 2.

INVENTORS.
Charles A. Parker
Clifton K. Rainey
by Eugene E. Stevens
ATTORNEY.

INVENTORS.
Charles A. Parker and Clifton K. Rainey
BY Eugene E. Stevens
ATTORNEY.

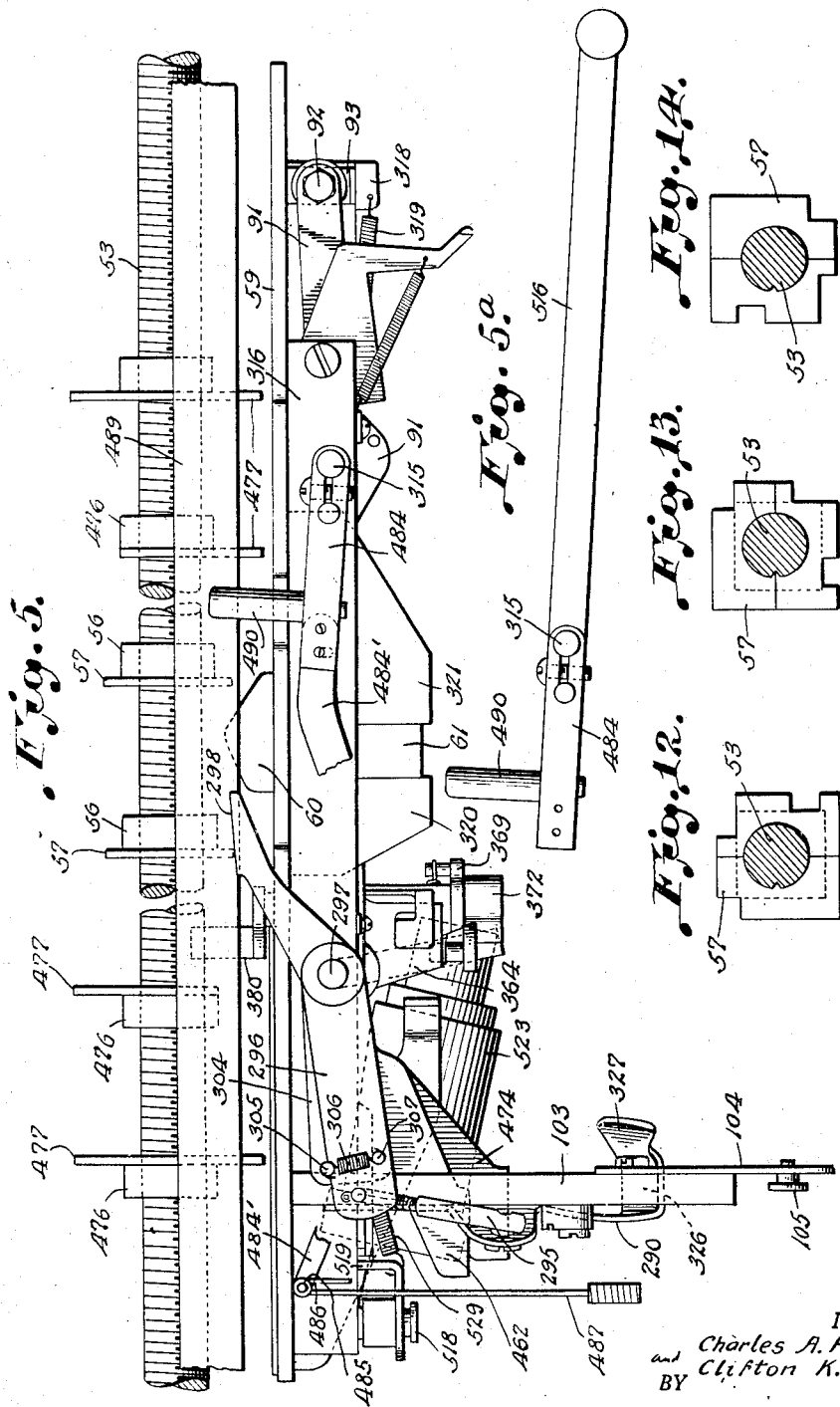

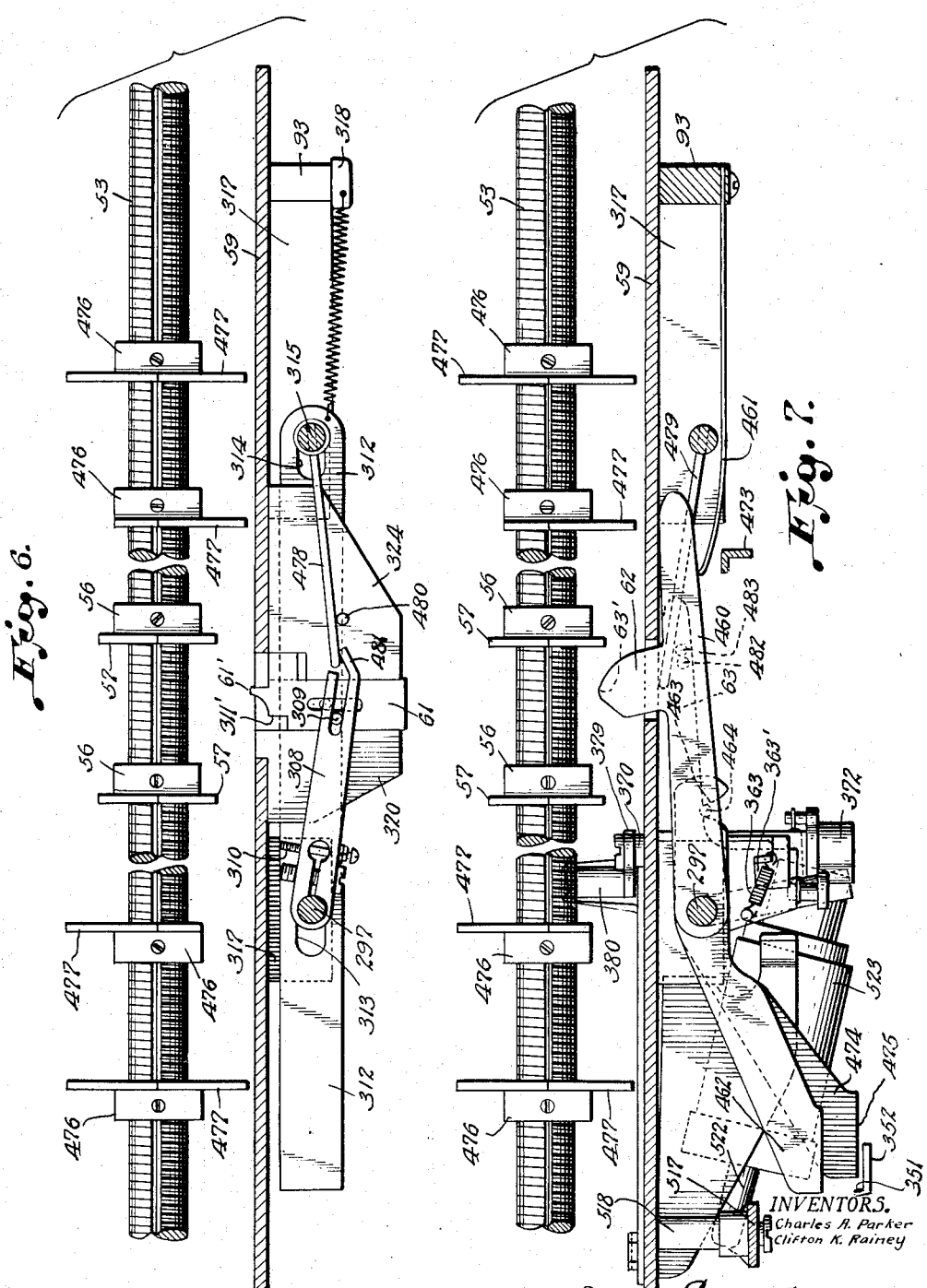

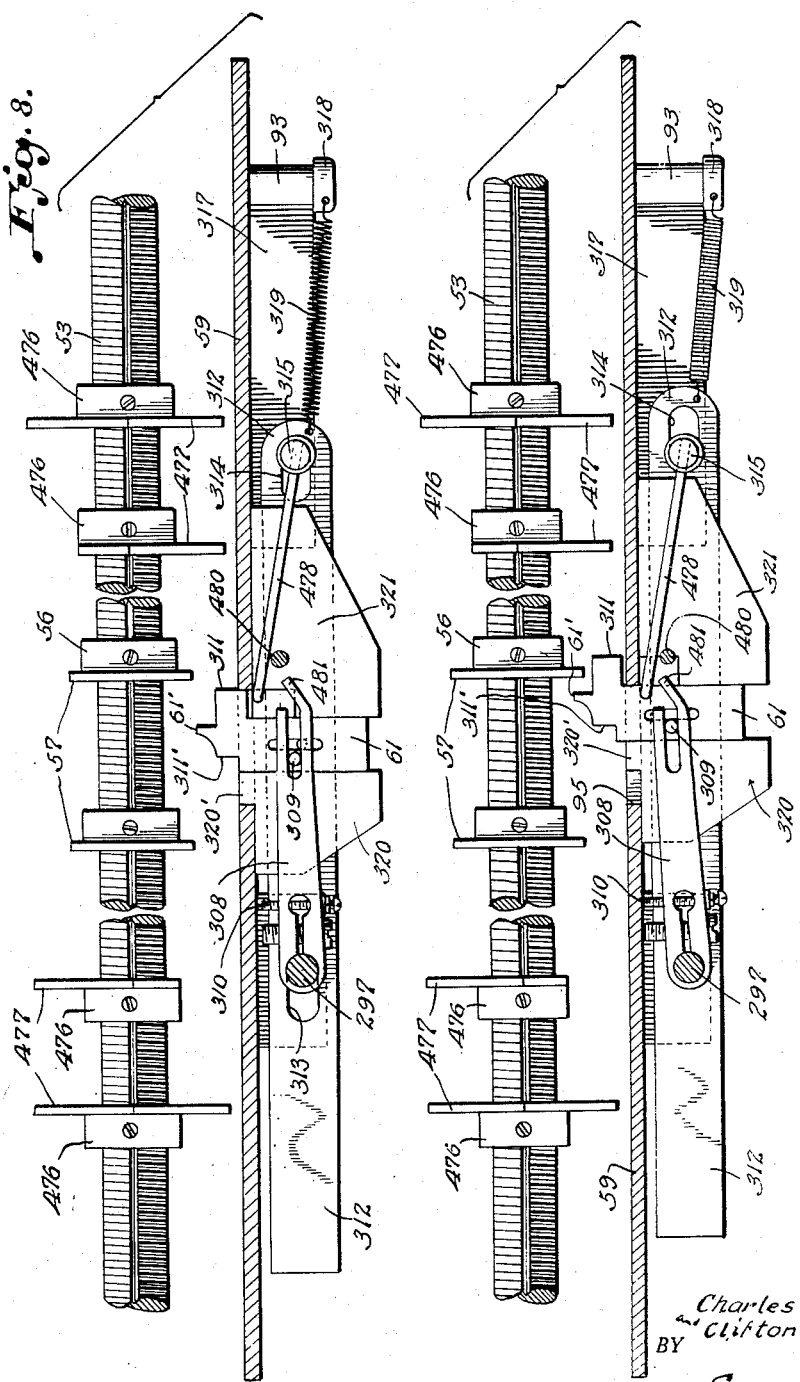

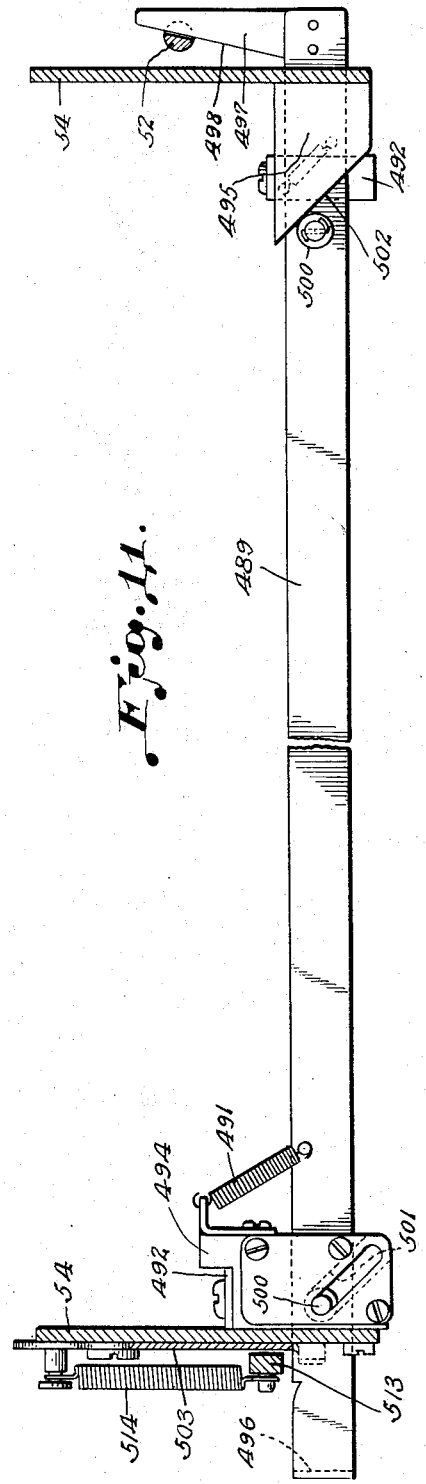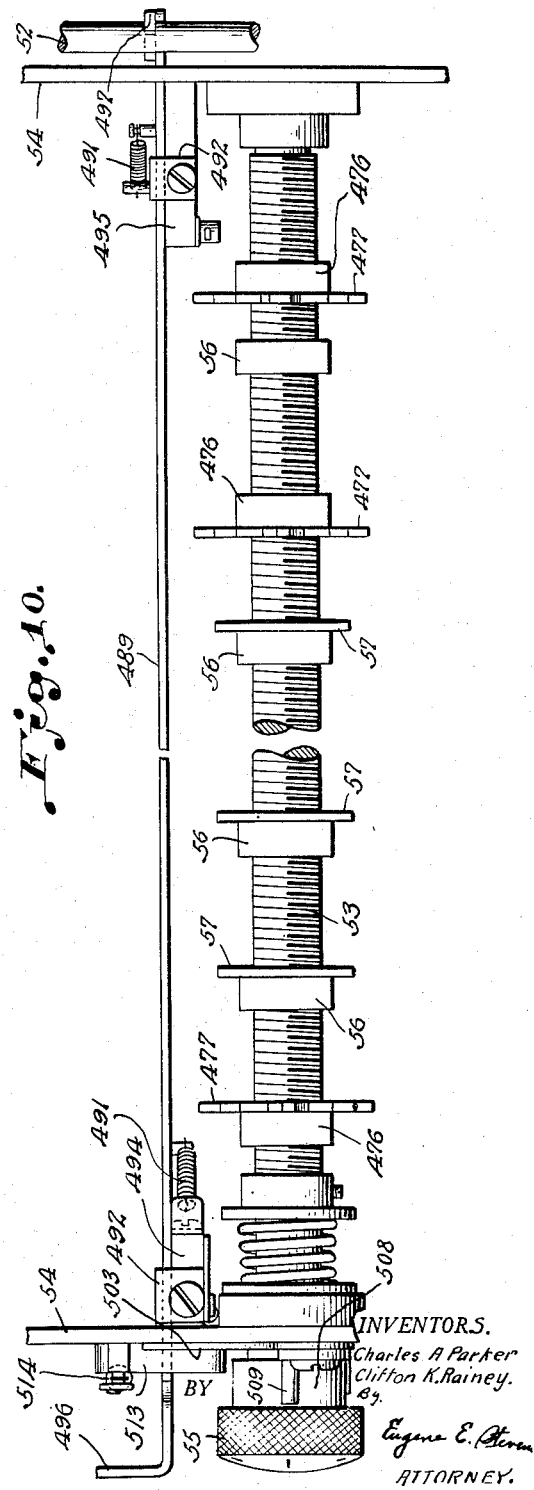

Jan. 18, 1955     C. A. PARKER ET AL     2,699,893
FUNCTION CONTROL CHANGE MECHANISM
Filed April 1, 1950     9 Sheets-Sheet 9
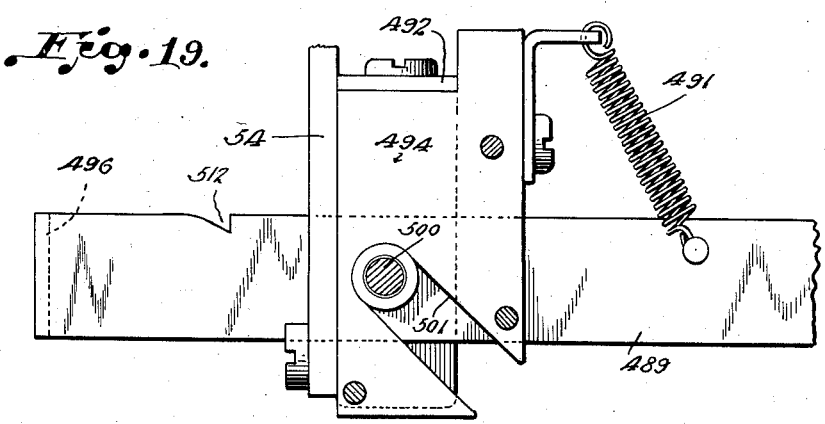
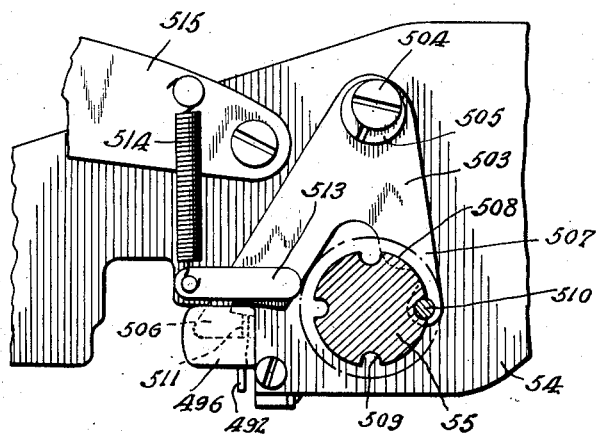
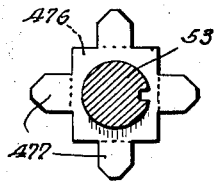
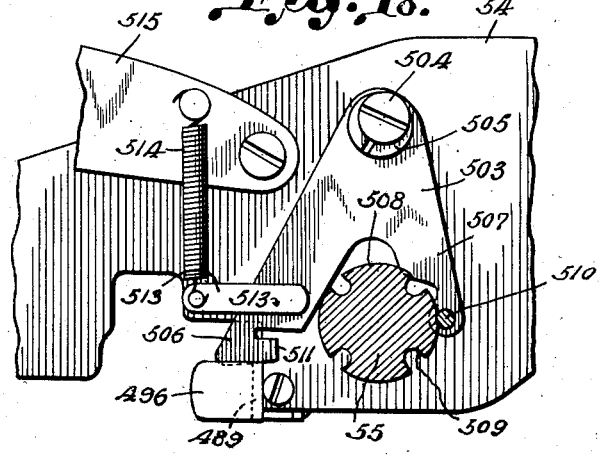
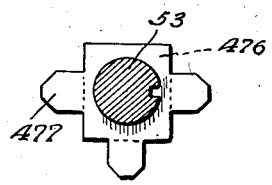
INVENTORS.
Charles A. Parker
Cliftion K. Rainey
BY
Eugene E. Stevens
ATTORNEY.

United States Patent Office 2,699,893
Patented Jan. 18, 1955

2,699,893

FUNCTION CONTROL CHANGE MECHANISM

Charles A. Parker and Clifton King Rainey, Knoxville, Tenn., assignors, by mesne assignments, to Burroughs Corporation, a corporation of Michigan Application April 1, 1950, Serial No. 153,392

12 Claims. (Cl. 235—60.5)

This invention relates to accounting machines of the type which include mechanism for typing, posting, and calculating in carrying out the various diverse phases of bookkeeping, in which the various functions of the machine are adapted for automatic control from the paper carriage of the machine.

Known types of such machines embody a plurality of movable conditioning elements adapted for cooperation with indexing means on the carriage to condition the machine selectively for sequential performance of various functions at different tabular stop points of the carriage. The various phases of bookkeeping require different tab settings, columnar arrangement, and different sequential operation of the mechanism at different tabulator stop points. The difficulty of changing over the machine each time it is to be used for a different phase of bookkeeping has long been a problem in the art. One practical solution of the problem is presented in the control mechanism of U. S. Patent No. 2,492,887 of December 27, 1949, to C. K. Rainey, which utilizes indexing means adjustable on the carriage to engage and actuate conditioning elements that normally are projected into the path of travel of the carriage-mounted indexing means incident to its reciprocation. The indexing means is arranged in a plurality of different sets that are selectively presented to the conditioning elements by manual rotation of a control member to different positions, each corresponding to a different phase of bookkeeping.

Other known types of program or phase change mechanisms make use of a plurality of interchangeable plates or bars each provided with a different pattern of indexing means as the control member. This control member must be removed and a new one attached each time the machine is to be used for a different phase of bookkeeping.

In every case, regardless of the particular type of phase change mechanism, the carriage must be shifted from its last tabulator stop point before a phase change is made, as otherwise the indexing means on the control member or plate will strike against the projected conditioning elements with consequent damage to the mechanism. Furthermore, even though the carriage be shifted, there is still danger of damage when a new replaceable control bar or plate is inserted, because the different pattern of indexing means may be such that some portions will strike against one or more of the conditioning elements. Even highly skilled operators sometimes neglect to move the carriage far enough to insure against damage in a phase change, and the average operator many times forgets to shift the carriage at all. Jamming and breakage due to operator neglect or inattention is a major cost factor in repair and maintenance in all known prior art types of accounting machines equipped with phase or program change mechanism.

A primary object of this invention is to provide phase change mechanism having means for bodily removing the machine conditioning elements from any possibility of contact with or by the indexing means of a changeable control member during a phase changeover, and without movement of the carriage from its last stop point prior to the change.

Another object is to provide, in such a removing means, automatic means for locking the changeable control member against any phase changing movement until the conditioning elements are fully removed.

Another object is to provide, in such a removing means, mechanism for preventing return of the removed conditioning elements to their initial position until the phase changeover has been completed.

Still another object is to provide, in an accounting machine of the typewriter-bookkeeping type having settable function conditioning elements adapted for actuation by carriage-mounted indexing members, means for removing the conditioning elements from and holding them out of the path of travel of the indexing members when the machine is employed solely as a typing machine.

A further object is to provide a novel tabulating mechanism in which the carriage energy in striking a tabulator stop pawl is utilized to sustain the pawl in operative engagement with the carriage until the carriage has positioned itself accurately at the stop point determined by the pawl.

Still another object is to provide a novel tabulator mechanism in which the tabulator stop pawl functions also as the margin stop means for the carriage.

A still further object is to provide tabulator mechanism including a single tabulator stop pawl that functions also as a margin stop capable of operation to determine margins within margins selectively at a plurality of zones along the length of the carriage.

Other and incidental objects will be apparent from the following description in conjunction with the accompanying drawings.

In the drawings:

Fig. 2 is a top plan view, with portions removed for clearness of detail, illustrating various structures and arrangement of parts which enter into the invention, underlying the area of the carriage C as shown in Fig. 1;

Fig. 5 is a fragmentary detail of the mechanism with parts in elevation taken substantially on the section line 5—5 of Figure 2;

Fig. 5a is an elevation of a modified arrangement of means for actuating the mechanism for removing the machine conditioning elements from the path of travel of the indexing means on the carriage;

Fig. 6 is a section taken substantially on the line 6—6 of Fig. 2;

Fig. 7 is a sectional view of the mechanism immediately in rear of that shown in Fig. 6;

Fig. 8 is a view similar to Fig. 6 and illustrating the tabulator stop pawl in its normally retracted position;

Fig. 9 is a view similar to Fig. 8 and illustrating the tabulator stop pawl in elevated operative position;

Fig. 10 is a top plan view of the phase change control mechanism located immediately beneath the rear of the paper carriage of the machine;

Fig. 11 is an elevation illustrating the mounting of the depressor bar forming an element of the structure shown in Fig. 10;

Figs. 12, 13 and 14 are, respectively, transverse sections through the phase change control element of the machine, illustrating various positions assumed by the indexing means mounted thereon;

Figs. 15 and 16 are, respectively, transverse sections through the phase change control member, illustrating the mounting of margin stop members thereon;

Fig. 17 is a fragmentary elevation taken from the left of Fig. 10, illustrating the detail of the locking means for the phase change control mechanism;

Fig. 18 is a view similar to Fig. 17, but illustrating the position of the parts during a phase changing operation of the control member; and Fig. 19 is a fragmentary elevation of a detail of the structure shown at the left hand of Fig. 11.

Figure 1:
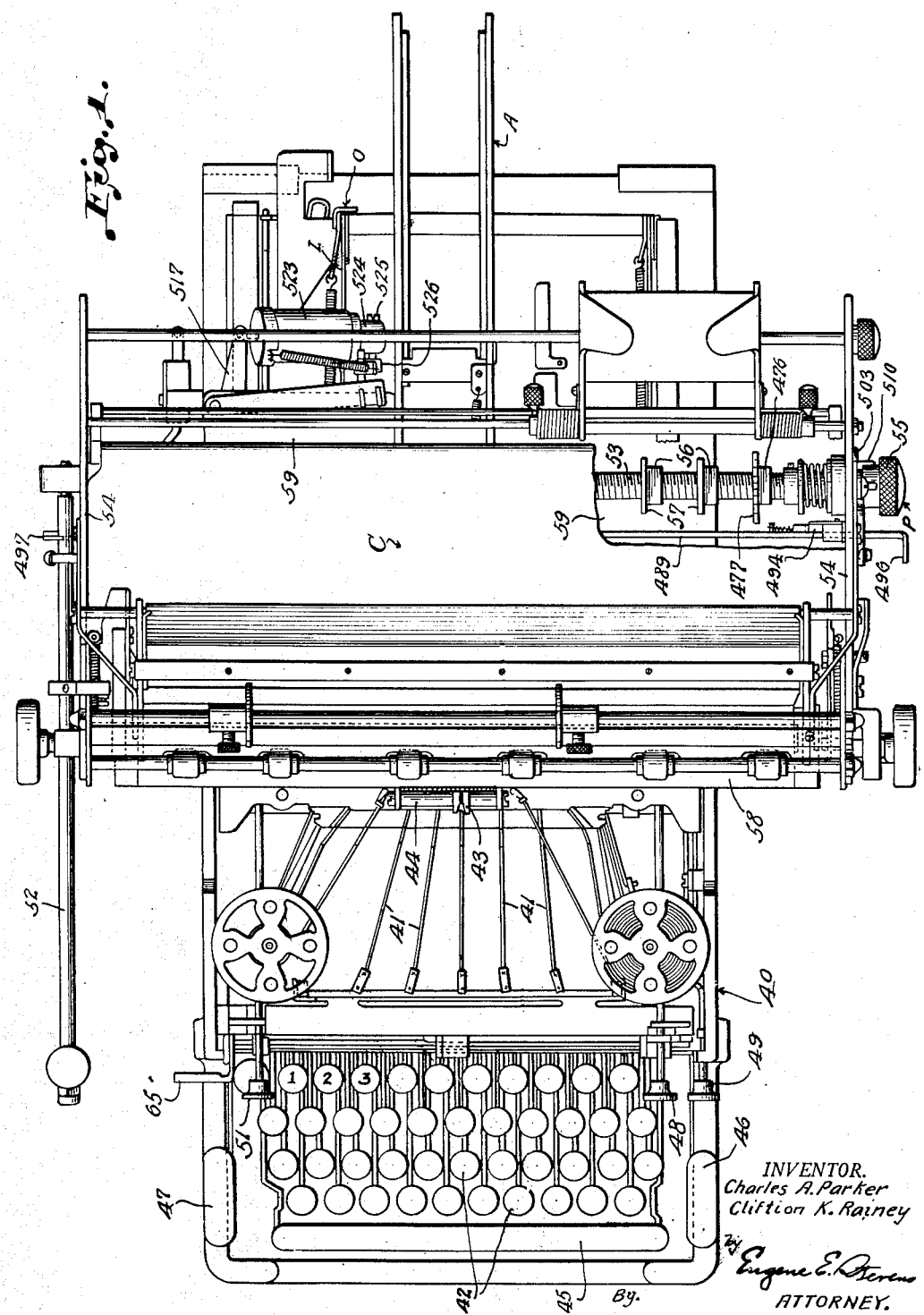
Fig. 1 is a top plan view of a complete bookkeeping machine in which the invention is incorporated.

As indicated generally in Figs. 1 and 2, the apparatus essentially comprises a main frame 40 of the general form and structure of a typewriter frame, being provided with a keyboard and having a carriage assembly C mounted on the frame for reciprocation in the usual manner of typewriter and posting machine carriage operation.

The machine is equipped with a bank of front strike type bars 41 operated from keys 42 for front strike visible printing at a point determined by a type guide 43 which forms part of a hammer member 44 that operates to effect a common striking movement against a properly positioned series of adding type bars when they are disposed for printing. The keyboard has the usual spacer 45 and, at the right hand side of the frame, a motor bar 46. On the left hand side of the frame is disposed a tabulator bar 47. The front plate of the frame mounts keys for controlling the functions of calculating mechanism generally indicated at A. These keys at the right hand side of the frame comprise an adding key 48, a total key 49 and, at the left hand side of the frame, a subtract key 51. The type guide 43 establishes the printing point and establishes also the decimal point for item printing in the calculating machine operation. The carriage is provided at its left hand end with a forwardly directed return handle 52 which is substantially of conventional design and which may be rotated to effect line spacing in the usual manner of such devices.

In the apparatus of this invention there are the usual carriage controls common to typing and posting machines, and in addition there are controls, in association with tabulator mechanism and various other instrumentalities, which under the operation of the carriage change the sequence of control function. This change in sequence has relation to the various phases of bookkeeping; such as, accounts receivable, payroll, etc. Each phase makes use of a different set of forms, and the columnar arrangement of various forms requires different tab settings and different sequential operation of the mechanism at different tabulator points. The carriage is provided with change means manually shiftable to condition the machine for desired sequential operation in accordance with that particular bookkeeping phase in which the machine is currently employed. This phase change mechanism is indicated generally at at P and is the same mechanism disclosed in U. S. Patent No. 2,492,887, December 27, 1949, to Clifton King Rainey. In general, it comprises a shaft 53 mounted for rotation in the carriage end plates 54 under the influence of an operating head or knob 55. The shaft has secured thereto for rotation therewith at desired intervals along its length a series of indexing members 57 on blocks 56. The change control shaft 53 parallels the roll platen 58 and is spaced rearwardly therefrom to overlie a control plate 59 that is mounted on and horizontally across the upper rear of the main frame. This plate serves as a support for a plurality of machine conditioning detents, here shown as four in number, respectively designated as 60, 61, 62 and 63, which will be described later in detail. These detents operate under the actuation of the lugs 57 of the phase-changing unit to condition the machine for the desired sequential operation of the various elements of the mechanism in accordance with the particular bookkeeping phase in which the machine is engaged.

A highly important aspect of the present invention is its selective operation under the influence of a function control lever 65 mounted at the left hand side of the frame in advance of the front face plate for manipulation by an operator. This function control lever 65 is adapted for movement to any of three control positions. In its uppermost position it conditions the machine for operation as an adding machine. In its second, or intermediate, position the machine is conditioned to function as a posting machine. In its lowermost position the machine is conditioned for straight typing operation.

Another important feature of the invention resides in the mechanism by which the numeral keys of the keyboard are converted to indexing means for the calculating unit. In the course of such conversion the letter keys are locked against operation. The numeral keys function as indexing means in both the upper and intermediate positions of the function control lever 65. In the intermediate position of the function control lever, when the machine is conditioned to carry out its posting functions, the indexing means is substantially governed by the carriage controls. In the upper position of the function control lever, when the machine is conditioned to function as a calculating mechanism, the indexing means is partially under carriage control.

An essential part of the machine is embodied in a driven reciprocable element which operates through a defined cycle between limit positions in one of which it is at rest, under the influence of motor means to accomplish many functions and to effect the positioning and actuation of the various members and instrumentalities by which the different operations of the associated mechanisms are carried out. This member, herein referred to as an operating frame generally designated at O, provides for the actuation of the various instrumentalities after the machine has been conditioned for their proper sequential operation.

Mechanism for converting the numeral keys to adding type bar indexing means comprises a vertically oscillatable lever 91 that is pivoted at one end on a pivot stud 92 carried by an under portion 93 of the control plate 59, see Figs. 2 and 5. Substantially intermediate its ends this lever 91 has affixed thereto the previously noted upstanding detent 60 which projects upwardly through a slot in the control plate. The lever 91 is normally spring biased to an upward position in which, for substantially its full length, it underlies and contacts the under surface of the control plate 59. Spring means 96 attached to the control plate and to the lever functions to hold the lever in its normal upward position with the detent 60 fully projected upwardly through the control plate slot. The phase change mechanism P has at designated points along its mounting member 56 one or more lugs 57 which forces down the detent 60 as the carriage moves to the appropriate position. This results in depression of the detent lever 91. At its free end the lever 91 has pivotal connection with a suspended link 98 which hangs vertically on the end of the lever and which is provided at its lower end portion with a closed end slot 99 that receives a pivot stud 100 on the rear end of one arm 101 of a bell crank lever that is pivoted at 102 to a depending support 103 which is secured at its upper end to the control plate 59. The other arm 104 of the bell crank lever has a pivotal connection 105 with the upwardly directed rear end of a pull rod 106 which extends horizontally forward in the machine assembly in operative connection with mechanism (not shown) which converts the numeral keys to adding type bar indexing means.

Figure 4:
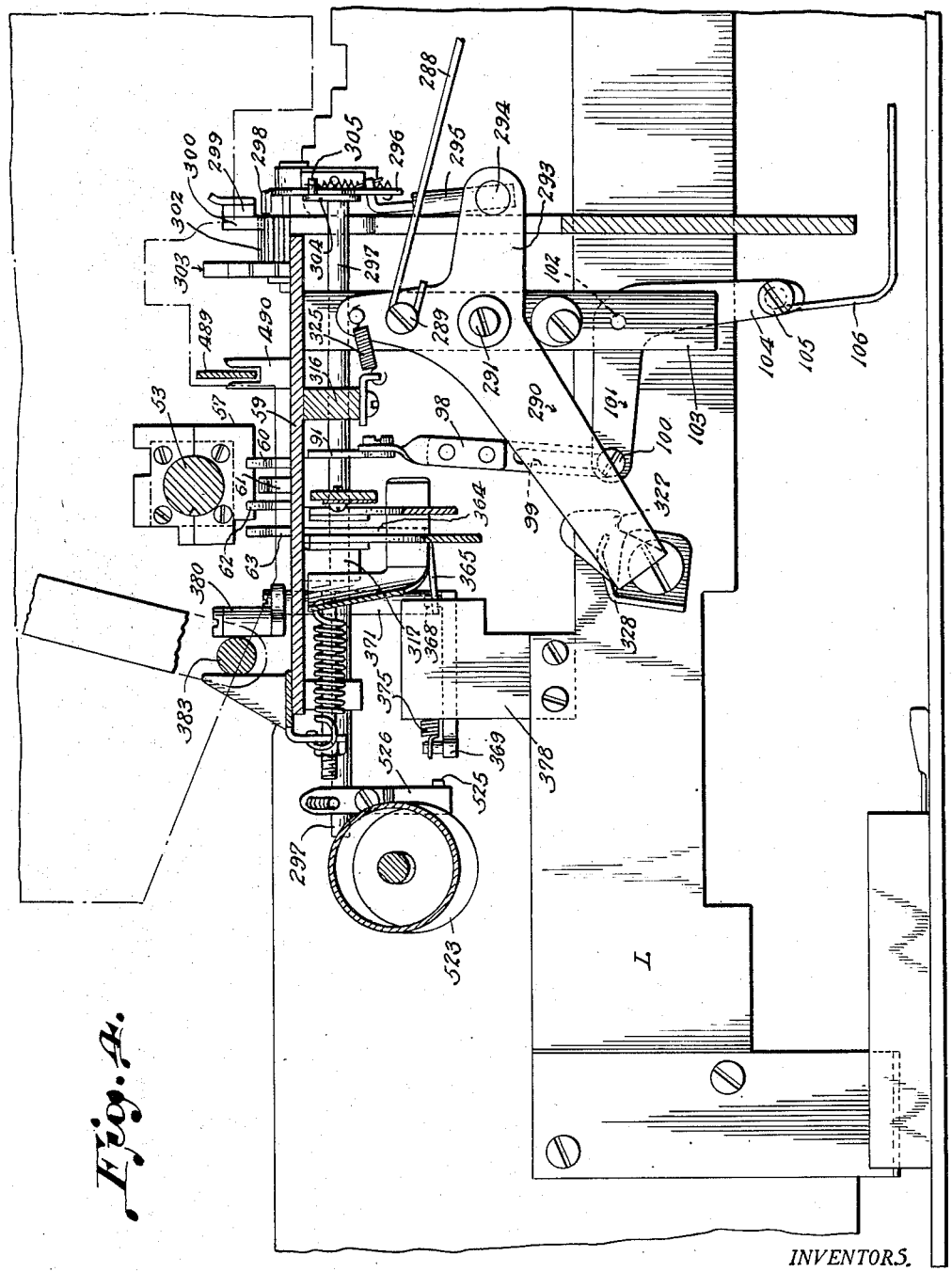
Fig. 4 is a vertical section substantially on the line 4—4 of Fig. 2.

The tabulator mechanism includes a conventional tabulator bar 47 that actuates a pull wire 288 which extends rearwardly in the frame adjacent the left hand side, as shown in Fig. 4. The rear end of the wire 288 is hooked for pivotal engagement under a lateral pivot stud 289 carried by a rocker arm 290 that is pivoted for oscillation in a vertical plane on a pintle 291 that is mounted in a depending support 103 rigidly secured at its upper end to an element of the control plate 59. The rocker arm 290 is substantially Y-shaped with the fork of the "Y" upwardly of the pintle 291 and the shank portion extending rearwardly and downwardly in the normal position of the parts. One fork 293 of the rocker arm which is the lower fork viewed with respect to Fig. 4, has a pivotal connection 294 with a link 295 that is pivotally connected at its upper end to a laterally extended lever 296. The lever 296 is pivoted intermediate its ends to oscillate in a vertical plane on a shaft 297 that is journalled for rotation in mounting elements fixed to the under part of the control plate 59. The upper free end of the lever 296 is formed with a flat bearing portion 298 which normally contacts the under face of a bar 299 that extends longitudinally of the carriage assembly and which carries a carriage rack 300. This assembly of rack and bar extends longitudinally of the carriage and is pivoted at each end on the end plates of the carriage so that when the bearing portion 298 is elevated the bar 299 is rocked on its pivot to lift the rack bar 300 out of its normal engagement with the teeth of the pinion 302 which is a part of the conventional escapement assembly indicated generally at 303. When the tabulator bar 47 is manually depressed the pull wire 288 is drawn forwardly to rock the arm 290 on its pintle and depress the link 295 which, in turn, swings the lever 296 on its pivot to lift the bearing portion 298 and release the rack as described.

Concurrently with actuation of the lever 296, mechanism is operated to elevate the tabulator pawl 61, previously described. This mechanism includes a crank 304 that is fixed to the shaft 297 for rotation therewith. The crank 304 lies flatly alongside the lower portion of the lever 296 and carries a laterally directed pin 305 that overrides the upper edge of the lever. This pin anchors one end of a retracting spring 306 which at its other end is secured to a pin 307 on the lever. The normal tension of the spring 306 biases the lever 296 upwardly against the crank pin 305. When the lever is depressed a pull is exerted through the spring 306 which conjointly carries down the crank 304 to rock the shaft 297. This rocking action of the shaft 297 is counterclockwise with respect to Figs. 5 and 8.

With reference to Fig. 8, which shows the tabulator pawl in normal unlatched position, it will be seen that the shaft 297 has fixed thereon for movement therewith a crank 308 which extends beneath the control plate 59 to the region of the slot in which the pawl 61 is mounted. The free end of the crank 308 is bifurcated to receive in slidable engagement a pin 309 carried by the shank of the pawl and extending laterally therefrom. As the shaft is rocked counterclockwise with respect to Fig. 8, engagement of the bifurcated end of crank 308 with the pawl-carried pin will lift the pawl to its elevated position, as shown in Fig. 9. Adjustable means 310 is carried by the crank for cooperation with the under face of the control plate to determine the limit of upward movement of the pawl. The upper end portion of the pawl shank is formed with a lateral enlargement providing a shoulder 311, the edges of which are squared. Normally, in the depressed position of the pawl, the vertical edge of the enlargement is engaged against the adjacent end of the pawl-receiving slot in the control plate. When the pawl rises under the lifting action of the crank 308 mechanism is permitted to function which shifts the pawl longitudinally with respect to the control plate so that the bottom edge of the enlargement 311 overrides and seats upon the upper face of the plate. In this position the pawl is latched against depression.

This shifting mechanism comprises a longitudinally reciprocable bar 312 that is provided with spaced longitudinally disposed slots 313 and 314 which receive laterally therethrough the shaft 297 and a shaft 315, both of which are mounted transversely between a pair of supporting blocks 316 and 317 secured to the under face of the control plate longitudinally thereof in forwardly and rearwardly spaced relation relative to the assembly of detents 60—63 shown in Fig. 2. Adjacent the right hand end of the block 317 there is provided a member 318 secured to the control plate and which forms a point of anchorage for one end of a retracting spring 319 that is connected at its other end to the adjacent end of the reciprocable bar 312. The spring 319 provides a bias constantly urging the bar 312 to the right, as viewed with respect to Figs. 8 and 9. This bar 312 carries in fixed relation a pair of side plates 320 and 321, that are spaced apart longitudinally of the bar to provide a vertical guide channel in which the shank of the pawl 61 is slidable. When the activating force on the shaft 297 and crank 308 is removed, as when an operator releases the tabulator bar, the pawl remains in its latched position by reason of the holding action of the shoulder 311. In this latched position the crank 308 is held in its elevated position and as the crank is fixed to the shaft 297, this shaft is, in turn, anchored against rocking; so that its crank 304, best shown in Figs. 2, 4 and 5, acts through the stud 305 to hold down the adjacent portion of the rack lifting lever 296. The bearing portion 298 of this lever remains in elevated position holding the rack bar out of engagement with the teeth of the escapement mechanism, so that the carriage is free to move under its draw band actuation until a tabulator stop lug, one of which is shown at 57 in Fig. 3, engages the vertical edge of the tip 61' of the pawl. When this engagement occurs the momentum of the carriage acts to shift the pawl to the left so that its shoulder 311 moves out of engagement with the control plate and the pawl is positioned so that it can move downwardly to its unlatched position, as shown in Fig. 8, upon actuation by the appropriate mechanism. When the pawl is disposed in its normal unlatched position the left vertical edge of its shank abuts the adjacent vertical edge of the plate 320 which, in turn, has an upstanding portion 320' that fills the space between the edge of the pawl shank and the adjacent end of the pawl-receiving slot 95 in the control plate, see Fig. 9. The portion 320' constitutes a reinforcing element which assists in absorbing the striking impact of the carriage-mounted tabulator stop. Usually, when the carriage is moving to carry the tabulator stop into engagement with the pawl, there is a forcible striking action of the tabulator stop against the pawl. The strain thus imparted to the pawl tends to angle the pawl in its guide channel between the plates 320 and 321. This angling strain is transmitted to the walls of the guide channel as a spreading action which is, of course, resisted by the anchorage of these plates with respect to the bar 312. At the same time the strain on the pawl is transmitted through the extension 320' so that the blow is taken up through this extension by the adjacent end of the pawl-receiving slot in the control plate. The presence of this reinforcing portion 320' between the edge of the pawl shank and the adjacent edge of the control plate slot further takes up the striking impact and eliminates any possibility of the pawl-carried pin 309 forcing the link 308 laterally to impart a strain on the mounting of the shaft 297.

When the pawl 61 has been struck by a carriage tabulator stop and is shifted out of its latched engagement with the control plate it is of primary importance that the carriage rack 300 be engaged with the teeth of the escapement pinion 302, in order that the carriage shall be positioned as precisely as possible. Due to the pull of the carriage draw band, the pawl and the upstanding reinforcing portion 320' of its guide plate are forced against the adjacent end of the control plate slot, so that the precise stoppage of the carriage is affected. In the present invention, means is employed that imparts a constant bias to the carriage rack which results in the reengagement of the carriage rack with the escapement pinion simultaneously with downward movement of the pawl 61 to its fully depressed position. This means comprises a pair of springs 322, one at each end of the carriage, connected between a point of anchorage on the carriage and a bracket 324 fixed to the rack 300 and its mounting bar 299. The bias of the springs 322 is acting constantly to urge the rack into escapement-engaging position but its bias is resisted, so long as the pawl 61 is elevated, by the holding action of the elevated portion 298 of the lever 296. When the pawl is latched in its elevated position there can be no actuation of the lever 296 on its fulcrum shaft 297 such as to lift the pin 305 and consequently the crank 304 to rock the shaft 297. This holding action transmitted through the lever 296 would prevent rocking of the shaft 297 to a movement, clockwise with respect to Figs. 8 and 9, sufficient to depress the tabulator pawl. As soon as the impact of the carriage tabulator stop has shifted the pawl 61 so that its latching shoulder 311 disengages the control plate, the full force of the springs 322 is immediately effective to carry down the bearing portion 298 and rock the lever 296 to rock the crank 304 upwardly and, through the medium of the shaft 297, thus immediately pull the pawl down to its normal depressed position. This action of lowering of the pawl and reengagement of the carriage rack with the escapement mechanism occurs simultaneously, so that the carriage is arrested at the precise point desired.

While the tabulator pawl 61 is latched in its elevated position the rocker arm 290 is held in the position to which it is moved by depression of the tabulator bar. When the pawl moves down to its depressed position the chain of mechanisms previously described operates to lift the link 295 and rock the arm 290 on its fulcrum point 291 to restore the rocker arm to its initial position prior to depression of the tabulator bar, as shown in Fig. 4. A light spring 325 is connected between a point of anchorage on the block 316 and the high point of the rocker arm 290. The function of this spring is merely to retain the parts against lost motion and loose play, especially when the conventional rack-elevating mechanism of the carriage is manipulated.

The tabulator mechanism, in this embodiment of the invention, is arranged for actuation by cycling movement of the operating frame. In furtherance of this actuation the shank of the actuator arm 290 which extends downwardly and rearwardly as shown in Figs. 4 and 5 has a laterally directed end portion 326 which is directed inwardly with respect to the frame assembly. As shown in Figs. 2, 4 and 5, this end portion has a cam tip 327 that is angled upwardly and forwardly in diverging relation with respect to the shank of the arm 290. This cam portion 327 normally is disposed in the path of travel of an abutment 328 mounted on the left hand side plate L of the operating frame. As the operating frame moves forward through the first half of its cycle the abutment 328 cams against the tip 327 and displaces the entire rocker arm 290 laterally with respect to its support 103. In order to permit this lateral displacement, the pivot stud 291 is passed through the support and through the rocker arm and carries an attached washer 329 which anchors one end of a coil expansion spring 330 that bears at its other end against the face of the rocker arm. The spring 330 permits lateral displacement of the rocker arm 290 against the bias of the spring, and when the operating frame-carried abutment 328 passes forwardly beyond the cam tip 327 the bias of the spring returns the arm 290 laterally to its initial position. Upon return movement of the operating frame in the second half of its cycle the abutment 328 engages the tip 327 and rocks the arm 290 on its fulcrum point 291 to accomplish the setting of the tabulator pawl 61 in the same manner as the setting is accomplished by manual depression of the tabulator bar, as previously described. In the continued rearward movement of the operating frame the abutment 328 moves rearwardly from and disengages the cam tip 327 of the rocker arm and the arm then returns to its initial position in the course of the downward movement of the tabulator pawl, as previously described.

Figure 3:
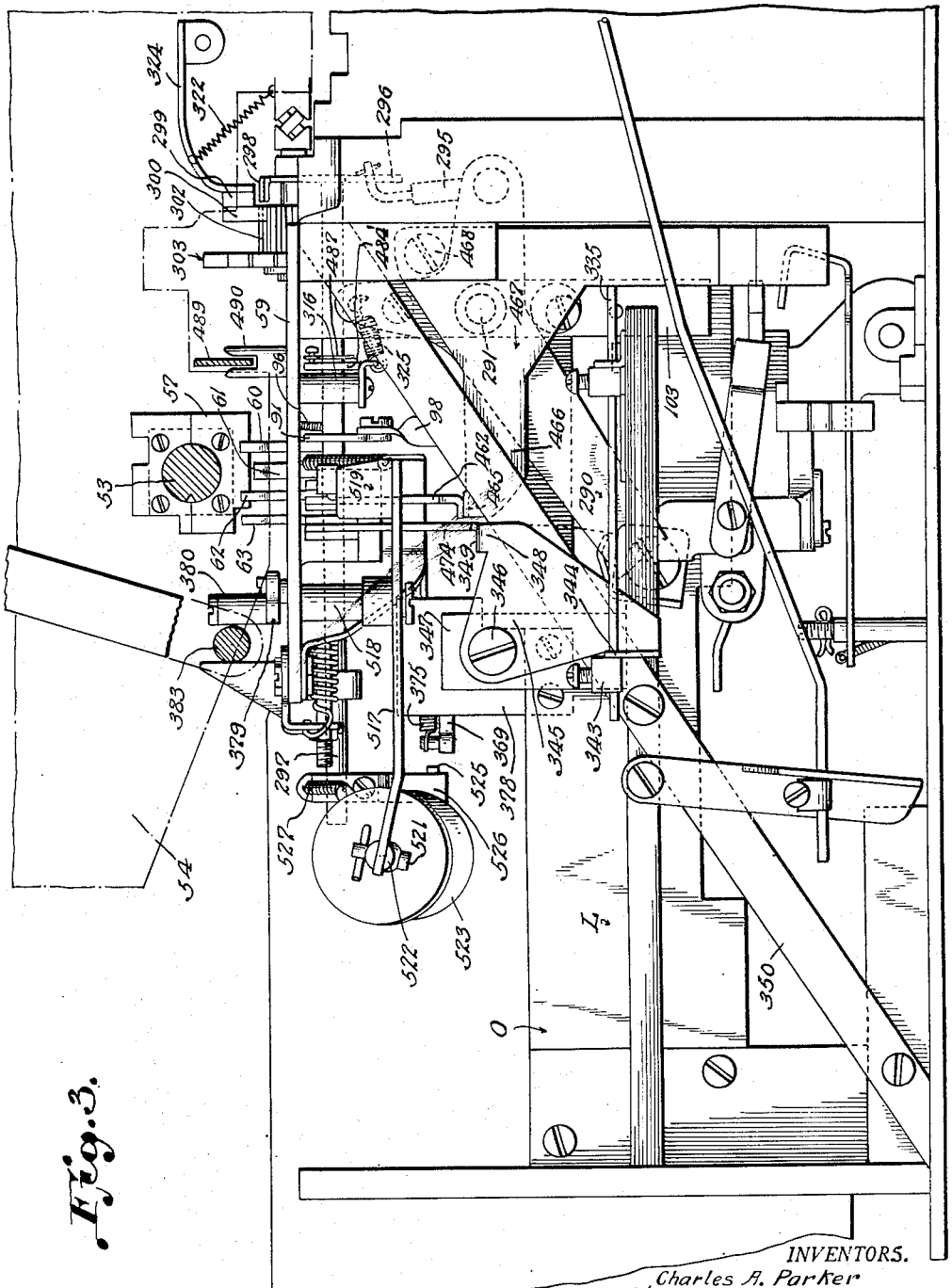
Fig. 3 is substantially a side elevation taken from the right hand of Fig. 2.

When the function control lever 65 is moved to its upper adding position, it exerts a pull on the wire 335, see Fig. 3, to condition the machine for line spacing operation under cycling movement of the operating frame. In order to accomplish this function the rear end of the pull wire 335 has secured thereto a collar 343 that abuts an ear 344 carried by a bell crank 345 that is pivoted to rock in a vertical plane on a fulcrum stud 346 mounted in a support 347 secured to an element of the main frame. The bell crank 345 has a forwardly extended arm 348 which carries an integral inwardly and laterally directed bridging portion 349 that overlies with appropriate clearance a bracing strut 350 which constitutes an element of the main frame structure. At its inner end relative to the assembly, the bridging portion has a downwardly directed extension 351 that, in turn, has an inward laterally directed terminal lug 352 which provides a lift means that functions in conditioning the machine for line spacing operation under the influence of the operating frame.

The control plate 59 mounts the line spacer detent 63 for vertical oscillation through a receiving slot provided in the plate. This detent 63 comprises a transversely extended lever that is fulcrumed at one end to pivot on the shaft 297 with the body of the lever extending transversely in the assembly longitudinally beneath the under surface of the control plate. Spring means 363 is utilized to position the detent lever 63 normally elevated in its receiving control plate slot with its pawl tip 63' in its extreme elevated position. The spring 363 is anchored at one end to a pin extending laterally from one end of the detent lever 63 and is connected at its other end to a point of attachment on a fixed element 363' (see Fig. 7) on the under side of the control plate 59. As shown in Fig. 2, the bottom edge of the detent lever 63 has a vertically depending portion 364 that is formed with a rearwardly and horizontally directed lip 365. The lip 365 has a stepped rear edge providing a shoulder 366. Normally, with the detent lever 63 positioned with its pawl tip in elevated position, the lip 365 is so disposed that its shoulder 366 is spaced forwardly of and in the path of movement of an upstanding stud 368 carried by a horizontal rocker 369 loosely pivoted at one end on a vertical shaft 370 which is disposed within a vertical tubular housing 371 secured at its upper end to the control plate 59. The shaft 370 extends at both ends beyond the adjacent ends of its fixed tubular mounting housing 371. The lower end of this shaft has fixed thereto for rotation therewith a collar 372 formed with an integral horizontal radial arm 373 that lies immediately beneath the rocker 369, extending in the same direction as the rocker. The forward side edge portion of the arm 373 extends forwardly with respect to the adjacent forward side edge of the rocker 369 which immediately overlies it. In the clearance thus provided the arm 373 carries an attached upstanding stud 374 which forms a point of anchorage at one end of a retracting spring 375 that is connected at its other end to a point of attachment 376 on the upper face of the rocker 369. The bias of spring 375 acts to urge the rocker and the underlying arm together in vertical registry to the limit permitted by engagement of the stud 374 against the adjacent forward side edge of the rocker.

The rocker 369 has a straight edge portion 377 that is normally biased into contact with an upright 378 fixed to the left side plate L of the operating frame. The upper end of the shaft 370 extends above the plane of the top face of the control plate 59, as shown in Figs. 3, 4 and 7, and has fixed thereon for rotation therewith a radially extending arm 379 which carries an upstanding stud 380. This stud bears against and operates line spacer mechanism, a portion of which is shown at 383.

When the operating frame moves forwardly in the first half of its cycle the upright 378 moves sufficiently far forward to clear the adjacent end of the rocker 369 and permit a movement of the rocker to the point at which it is arrested by engagement of its stud 368 against the shoulder 366 of the line spacer detent lever portion 365. Unless the pawl of the detent lever 63 has been depressed, the lip 365 holds the rocker 369 against further rocking movement. Should the line spacer detent pawl be depressed through engagement by an appropriate one of the lugs 57 on the phase changing member P, the downward movement of the lever at its pawl end acts to shift the lip 365 laterally sufficiently far to move the shoulder 366 from the path of travel of the rocker-carried stud 368. This stud then is free to move without hindrance from the lever-carried lip. With the freedom of movement thus provided the rocker 369 swings counterclockwise behind the forwardly moving operating frame-carried upright 378. In this movement it carries with it the underlying arm 373 that is attached to the shaft 370, so that the shaft is rocked by the pressure of the bottom rod 383 of the swinging frame against the stud 380 under the pull af a spring.

When the operating frame moves rearwardly in the second half of its cycle its upright 378 cams against the rocker 369 and rocks the same, moving it back to its initial position. The bias of spring 375 holds the shaft arm 373 tightly associated with the rocker so that it moves with the rocker to rock the shaft 370 and, through the arm 379 and stud 380 at its upper end, to move the bottom rod 383 rearwardly against tension of its spring. The mechanism will thus have been manipulated to effect one line spacing operation.

The subtract detent 62, as best shown in Figs. 2, 3 and 7, projects upwardly through its receiving slot in the control plate 59 in position for engagement by one of the control lugs 57 of the series carried by the phase changing mounting member 56. This detent 62 is integral with a depressible lever 460 that extends longitudinally of the control plate 59 directly beneath the plate and which is pivoted at its left end to rock on the shaft 297. The opposite end of the lever is biased upwardly into contact with the under face of the control plate by means of a leaf spring 461 which engages the under edge of the lever and normally retains it in contact against the control plate. Also fulcrumed on the shaft 297 and directly alongside the lever 460 there is provided a pull down lever 462 which is pivoted on the shaft 297 intermediate its ends. The right hand end of the pull down lever extends in parallel relationship to the detent lever 460 and at its end portion is provided with a hook 463 which is engaged over a lateral stud 464 which projects from the adjacent face of the detent lever 460. At its left hand end the hold down lever 462 rests upon the upper face of a lift lug 465 which extends rearwardly from the rearwardly extending arm 466 of a bell crank 467 that is pivotally suspended from a fulcrum 468 mounted on an element of the main frame. When the subtract key is pushed inwardly it operates to rock the bell crank 467 to lift its bearing tip 465 and correspondingly to elevate the left hand end of the hold down lever 462 which normally is seated on the lug 465. This elevating action rocks the lever 462 on its fulcrum so that its hooked end 463 is depressed and draws down the detent lever 460 by its engagement with the pin 464. As the lever 460 is depressed against the bias of the spring 461 the subtract detent 62 is moved downwardly in its receiving slot in the control plate. In its downward movement under the influence of the manipulation of the subtract key the lever 460 operatively engages and actuates an element 473 of the calculating unit so that it is conditioned for subtract operation.

The line space detent lever 63, indicated in dotted line in Fig. 7, extends longitudinally beneath the control plate 59 and, as previously described, is fulcrumed on shaft 297 to rock in accordance with the depression and elevation of its detent pawl which extends upwardly through the control plate slot. This lever normally is biased under the action of its spring 363 to elevate its right hand end into contact with the under face of the control plate so that its detent is elevated with respect to the control plate-receiving slot. As in the case of the subtract lever 460, the line space detent lever 63 is similarly flanked by a hold down lever 474 that is identical in construction to the hold down lever 462 described in connection with the subtract mechanism. This hold down lever 474 is fulcrumed on the shaft 297 and at its left end extends downwardly into a bearing portion 475 that normally is spaced slightly above the lifting tip 352 of the crank 348 that is actuated by lifting movement of the function control lever 65 through the pull exerted by the wire 335, as described. When the bell crank 348 is rocked to elevate its bearing tip 352 the tip moves up and engages the bearing portion 475 of the lever 474 and elevates the end of the hold down lever to depress its forward end which, as previously stated, has a pull down connection with its associated line spacer detent lever 63 similar to that of the subtract lever 460. The resultant action depresses the right hand end of the lever 63 and as a result of its downward movement it conditions the line space mechanism for operation in the manner previously described.

The mechanism thus far described is that shown and described in the copending application of Charles A. Parker and Clifton K. Rainey, Serial No. 99,081, filed June 6, 1949, and forms no part of the present invention except as it enters into the combination.

For purposes of compliance with statutory requirements, a specific example of reduction to practice of the present invention is herein shown and described as applied to the accounting machine previously described, in which the detents 60–63 constitute a plurality of differentially settable machine conditioning elements. Three of these, the key conversion detent 60, the subtract detent 62, and the line spacer detent 63, have portions normally spring biased into positions elevated above the control plate 59 into the path of travel of the indexing means lugs 57 on the phase change control shaft 53 that is rotatably mounted on the traversing carriage C, as shown in Figs. 3 and 4. The fourth, which is the carriage tabulator stop pawl 61, normally occupies a retracted position in which its tip 61′, although it extends above the control plate 59, is disposed just beneath and out of the path of travel of the indexing lugs 57. In this position of the tabulator stop pawl its edge portions 311 and 311′ are directly in the path of margin stops that are adjustable on the carriage. These margin stops are generally similar to the indexing member 56, and comprise identical mounting blocks 476 (see Figs. 15 and 16) adjustably fixed to the phase change control shaft 53 and carrying stop lugs 477 so arranged that they can engage only the tabulator stop pawl during travel of the carriage.

When the function control lever 65 (Fig. 1) is shifted to condition the machine for performance solely as a typing machine, it actuates mechanism which displaces and holds out of the path of travel of the indexing members all machine conditioning elements except the tabulator stop pawl 61; and when the carriage return lever 52 is actuated it operates the same mechanism to the same extent. By virtue of this arrangement, the carriage is relieved of the resistance which it would otherwise have to overcome in depressing the three machine conditioning elements 60, 62 and 63, and its operating speed is increased accordingly.

This displacing mechanism, see Figs. 2 and 5, is based on the shaft 315. This shaft has fixed thereto for rotation therewith a pair of radial arms 478 and 479 which extend in parallel spaced relation transversely of the machine beneath the control plate 59. The arm 478 at its free end overrides a lateral stud 480 on the lever 91 which carries the conditioning element 60 of the mechanism for converting the numeral keys 50 of the machine to indexing means for the stop pin box unit of the machine calculating mechanism A. The same end of the arm 478, see Fig. 8, normally extends in spaced relation over and above an upwardly angled terminal 481 on the free end of the arm 308 that is fixed at its other end to the shaft 297 and which functions to elevate and to pull down the tabulator stop pawl 61 in accordance with rocking movement of the shaft. The arm 479 at its free end overrides a lateral stud 482 on the lever 460 of the subtract conditioning element 62, and also overrides a lateral stud 483 on the line spacer conditioning element 63. When the shaft 315 is rocked counterclockwise relative to Figs. 5–9 it acts through the arms 478 and 479 first to pull down the detents 60, 62 and 63 until they are displaced out of the path of movement of the indexing lugs 57 on the carriage. If the shaft 315 be rocked further in the same direction the detents 60, 62 and 63 are further retracted, and the normally depressed tabulator stop pawl 61 is then further depressed when the arm 478 contacts and rides down the terminal 481 of the arm 308. This action carries down all four of the conditioning elements 60–63 out of the path of travel of not only the indexing lugs 57 on the carriage-mounted control shaft 53 but also the margin stops 476 as well, so that the carriage is free to move in either direction without hindrance, and the phase change unit can be rotated without contacting the conditioning elements.

The rock shaft 315 derives its movement from an actuator arm 484 that is rigidly attached thereto at one end and which parallels the support block 316 forwardly thereof beneath the control plate 59. The free end of the arm 484 carries an attached longitudinal extension 484′ which extends transversely in the machine beneath the shaft 297 and which terminates at its free end adjacent the end of the support block 316 at the left side of the machine. A lateral stud 485 on the free end of the extension 484′ is engaged by a vertically elongated hook 486 at the upper end of a flexible pull shaft 487 that is actuated from the function control lever 65 at the front of the machine by a suitable connection, not shown. Whenever the function control lever is tripped to its down position to condition the machine for straight typing operation the hook 486 pulls down the free end of the actuator extension 484′ and correspondingly rocks the shaft 315 to pull the conditioning elements 60, 62, 63 just out of the path of the indexing means on the carriage.

Means is provided on the carriage assembly for displacing the machine conditioning elements by rocking the shaft 315 independently of its actuation from the function control lever 65. This means comprises a depressor bar 489 that extends transversely of the machine above the control plate 59 forwardly of and parallel to the phase change control shaft 53. The body of the bar 489 is thin and flat and is disposed in a vertical plane. As shown in Figs. 3, 4 and 5, the bar is received within the slot of a bifurcated member 490 which extends upwardly above the actuator arm 484 and which is rigidly secured to the actuator arm. The bottom edge of the depressor bar 489 bears on the bottom of the slot in the bifurcated member and the bar is adapted to ride freely through the slot of the member 490 during travel of the carriage. As shown best in Fig. 10, the depressor bar extends beneath both end plates 54 of the carriage and projects somewhat beyond each plate at its adjacent end. The bar is spring suspended from the carriage assembly at each end by means of contractile springs 491 which are attached at their lower ends to anchoring studs on the body of the bar and which are attached at their upper ends to bracket elements 492 that are secured to blocks 494 and 495 attached, respectively, to the end plate 54 at the right hand end of the carriage and to the end plate at the left hand end of the carriage. Further, a supplemental support for the bar is effected through engagement of its bottom edge with the bottom of the slot in the bifurcated member 490. At the right hand end, the depressor bar 489 is provided with a laterally directed lip 496 to provide a handle by which the bar may be shifted longitudinally for independent movement relative to the carriage assembly. At the left hand side of the machine the projecting end of the depressor bar carries an upstanding rigid finger 497 having a surface 498 that is engaged by the inner end of the carriage return lever rod 52, as shown in Fig. 1. When the lever 52 is gripped and actuated in the return of the carriage, it is shifted laterally to the right with respect to Fig. 11 to impart a corresponding longitudinal shifting movement to the depressor bar 489. This lateral movement is slight and is effected by a loose fitting front bearing support and an elongated bearing at the rear section permitting limited lateral movement of rod 52.

Longitudinal shifting movement of the depressor bar to the right with respect to Figs. 10 and 11, whether effected manually from the handle 496 or automatically from the rod 52, is utilized to effect a bodily downward movement of the bar against the bias of the springs 491. This downward movement is brought about by the camming action of roller studs 500 which extend laterally from the body of the bar into engagement with inclined cam surfaces 501 and 502, respectively, on the blocks 494 and 495. As the depressor bar moves longitudinally, the camming action of the surfaces 501 and 502 against the roller stud acts to carry the bar down vertically against the pull of the springs 491. In this movement the bar is guided and constrained by vertically depending portions of the brackets 492 which cooperate with adjacent flat faces of the mounting blocks 494 and 495 to position the depressor bar accurately during its operation.

Vertical downward movement of the depressor bar correspondingly carries down with it the member 490 that is attached to the actuator arm 484, so that the shaft 315 is correspondingly rocked counterclockwise with respect to Fig. 5 to retract the conditioning elements. When the bar 489 is shifted manually from the handle 496 at the right hand side of the machine, it is cammed vertically downward to its fullest extent and this action is evidenced in a rocking of the shaft 315 to its fullest extent. Under these conditions, through the mechanism previously described, all the conditioning elements 60–63 are given maximum retraction and are depressed to a point at which they are substantially flush with the top surface of the control plate 59. In this position the conditioning elements are entirely withdrawn from the path of travel of the indexing members and the margin stops on the phase change control shaft 53 and are so positioned so that they are clear of any contact with or by any element of either the indexing members or margin stops when the control shaft 53 is rotated in the course of a phase changing operation.

When the longitudinal shift of the depressor bar 489 is effected by the rod 52, the longitudinal movement of the bar is of a lesser extent than that imparted by manipulation from the handle 496. Under this limited longitudinal shift the vertical depression of the bar 489 is correspondingly limited to a lesser extent so that the bar is cammed only part way down. This partial depression of the bar 489 acts through the member 490 and the actuator arm 484 to rock the shaft 315 through only a part of its permissible rocking movement and just far enough to carry down the conditioning elements 60, 62 and 63 out of the path of travel of the indexing members on the phase change control shaft. This partial movement of the depressor bar and limited rotation of the shaft 315 has no effect on the tabulator stop pawl 61, as the partial movement is only sufficient to carry down the depressor arm 478 to a point at which it engages but does not move the terminal 481 of the arm 308 which functions with respect to the shaft 297. Under these conditions, although the conditioning elements 60, 62 and 63 are moved out of the path of travel of the indexing members, the tabulator stop pawl 61 remains in its normal position. In this normal position, as shown in Fig. 8, the tip of the tabulator stop pawl is positioned out of the path of travel of the lugs 57 on the indexing members 56, but its shoulders 311 and 311' are in position for engagement by whatever marginal stop members 477 are presented for contact to limit travel of the carriage.

The depressor bar 489 has a further function in that it cooperates with latch mechanism to lock the phase change control shaft 53 from any possibility of rotation when the conditioning elements are in projected position or when said elements occupy any position in which there would be likelihood of contact by or with any of the indexing members or margin stops during rotation of the control shaft 53. By this mechanism the knob 55 on the shaft 53 is held against turning until the conditioning elements 60–63 are fully retracted by maximum lowering of the depressor bar 489. When the phase change control shaft 53 is being turned to present a new pattern of indexing members to the machine conditioning elements, the depressor bar occupies its fully lowered position and cannot be returned to its normal elevated position until the phase change control shaft is accurately positioned with respect to the new pattern of indexing members.

The mechanism for accomplishing this interlock includes a latch plate 503, see Figs. 17 and 18, that is pivotally suspended from a stud 504 secured to the outer face of the right hand carriage end plate 54. The pivotal suspension includes an eccentric bearing 505 which enables fine adjustment of the throw of the plate in the course of its swing. The plate 503 lies flatly alongside the carriage end plate and is forked at its lower end to provide a front leg 506 and a rear leg 507 which straddle the shank of the control shaft 53 between the hub portion 508 of the control shaft knob 55 and the adjacent carriage end plate. The hub 508 of the control shaft knob is provided with a circumferential series of axially disposed sockets 509 that are adapted individually to receive in nested engagement a laterally directed anchor stud 510 mounted at the bottom end of the rear leg 507 of the latch plate. In this embodiment of the invention the sockets 509 are four in number and are spaced ninety degrees apart. It is to be understood, however, that this arrangement may be varied to suit individual requirements depending upon the number of phase changes within the capacity of the phase change control shaft.

Fig. 17 illustrates the position of the parts in normal carriage operation with the phase change control shaft locked against rotation. This lock is accomplished by engagement of a laterally directed lug 511 on the lower end of the front leg 506 of the swinging plate against the side face of the depressor bar which is in elevated position. The engagement of the lug 511 against the front face of the depressor bar is maintained by the holding action of the anchor stud 510 on the rear leg of the swinging plate while it is seated in its appropriate knob recess 509. Under these conditions it is not possible for the plate 503 to be swung on its pivot, so that the knob 55 cannot be turned until the depressor bar is completely lowered. This interlock is maintained irrespective of longitudinal movement of the depressor bar and partial lowering of the depressor bar, such as occurs under the action of the carriage return handle 52 when it is manipulated.

When the depressor bar handle 496 is pushed fully inward the bar is given its maximum longitudinal shift and is carried down to its fully lowered position, as previously described. In this position, as shown in Fig. 18, the upper edge of the bar is disposed beneath the bottom edge of the front leg 506 of the swinging latch plate. Under these conditions it is possible to turn the knob 55 to change the pattern of indexing means to be presented to the machine conditioning elements. The sockets 509 in the hub portion of the knob are shallow and somewhat rounded so that when the knob is turned the anchor stud 510 is cammed out of the socket which it occupies and rides over the periphery of the knob. This action swings the latch plate 503 rearwardly and carries the bottom edge of the front leg 506 laterally across the upper edge of the depressor bar, so that the depressor bar is held down against any possibility of being raised until the knob is turned sufficiently far to register the anchor stud 510 on the latch plate with another of the sockets 509. When the pin registers with a socket, the upward bias on the depressor bar transmitted from the springs 491, supplemented by the effective force of the biasing springs which function normally to hold the various conditioning elements in projected position, becomes effective to cam the front leg of the latch plate upwardly so that the plate swings forwardly on its pivot to bring the anchor stud 510 into fully seated engagement in its aligned socket. In moving through this action the front leg of the latch plate swings forward to its original position as shown in Fig. 17, in which it clears the upper edge of the depressor bar, so that the bar automatically returns to its initial elevated position. A return of the bar to its elevated position relieves the force on the member 490, so that the biasing springs of the machine conditioning elements are free to return these elements to their normal positions and to rock the shaft 315 back to its initial position. When the depressor bar is pushed in for its longitudinal shift and is moved down into lowered position, the lower edge of the front leg 506 of the latch plate rides into a shallow notch 512 in the upper edge of the depressor bar and holds it against outward shifting by any accidental operation. The latch plate is retained in proper operating alignment by engagement of its front leg 506 beneath a keeper 513 that is secured to the adjacent end plate of the carriage. This keeper may conveniently serve as the anchor for the lower end of a retracting spring 514 that is connected at its upper end to an arm 515 of the paper holding bail on the carriage.

Fig. 5a illustrates a modified arrangement by which the actuator arm 484 may optionally be operated manually from a handle 516 forming a part of or attached to the actuator arm and extending from the right hand side of the machine beneath the carriage assembly. When the handle 516 is moved upwardly with respect to its Fig. 5a position, the shaft 315 is correspondingly rocked in the same manner as that of its actuation by the depressor bar acting through the member 490 and the arm 484. Upward movement of the handle 516 rocks the shaft 315 to its fullest extent and thereby carries down all the machine conditioning elements to their positions of maximum retraction, in which they are substantially flush with the upper surface of the control plate 59 and in which they are displaced from the path of travel of the various indexing members and margin stops on the phase change control shaft 53. An additional feature of this modified arrangement resides in its adaptability for co-operation with the depressor bar to effect its locking movement with relation to the phase change control knob. Simply by eliminating the springs 491 which serve to hold the bar, the full weight of the bar is effective to seat it in the slot of the bifurcated member 490, so that when the shaft 315 is rocked to lower the member 490 the depressor bar follows it down into the same position which it normally occupies when cammed down by the action of the roller studs 500 in its normal operation. With the bar in fully lowered position it cooperates with the latch plate 503 in the manner previously described to lock the phase change mechanism against operation. In such case, the bar would be returned to its normal elevated position through the force of the biasing springs which restore the machine conditioning elements to normal projected position.

Another highly important feature of the invention resides in mechanism for utilizing the energy of carriage impact of the indexing member lugs 57 against the tip 61' of the tabulator stop pawl to retain the stop pawl in its elevated carriage-arresting position until the carriage has settled accurately into the stop position defined by the tabulator pawl. In machine operation where a relatively wide space occurs between tabulator stop points, the impact of the indexing lugs 57 against the tabulator stop pawl is of considerable force, and ordinarily some rebound of the carriage occurs. In the machine of this invention, when the tabulator stop pawl is projected into carriage-arresting position, mechanism also is actuated simultaneously to disengage the carriage rack from the carriage escapement, and when the pawl is retracted the same mechanism becomes effective to reengage the carriage rack with the escapement. It thus becomes highly important that the tabulator stop pawl be sustained in its elevated position until the carriage has settled from its rebound, because if the stop pawl were permitted to drop down before the carriage had settled back from its rebound, the carriage rack would reengage the escapement at a point displaced relative to the stop point determined by the tabulator pawl. This would, of course, be highly detrimental to the proper printing function of the machine and would also affect the machine functions because the control lugs 57 of the indexing members would not then be properly positioned over the conditioning elements 60, 62 and 63.

The mechanism for sustaining the tabulator stop pawl in its elevated projected position includes a lever 517 that is pivoted intermediate its ends to oscillate in a horizontal plane on a pivot post 518 which is secured to and depends from the control plate 59. As best shown in Fig. 2, the lever 517 extends longitudinally with respect to the machine and is provided at its forward end with an upturned lug 519 that engages a laterally directed ear 520 carried by the left hand end of the longitudinally shiftable bar 312. This bar 312, as previously explained herein, normally is biased by the spring 319 to shift longitudinally to the right with respect to Figs. 8 and 9. Under the bias of the spring 319, when the shaft 297 is rocked to act through the arm 308 for elevation of the tabulator stop pawl, the elevated pawl is bodily shifted to dispose its shoulder 311 in latched engagement over the upper face of the control plate 59. The pawl remains in this position until its tip 61' is struck by the appropriate stop lug 57 on one of the indexing members 56. When the tabulator stop pawl is in its elevated and latched position the carriage rack is freed from engagement with the escapement. The striking force of the stop lug 57 carries the tabulator stop pawl bodily to the left with respect to Figs. 8 and 9, so that the entire bar 312 is correspondingly shifted longitudinally to the left. In the course of this movement the left hand end of the bar 312, acting through its attached ear 520, rocks the lever 517 to move its other end correspondingly inward. Said other end of the lever 517 has a pivoted connection 521 with the stem of a plunger 522 that forms an element of an air cushion dash pot 523 by which the striking force of the stop against the tabulator pawl is taken up. One element of the dash pot 523, such as the end section 524, is pivoted on a pintle 525 that is fixed to a rocker arm 526 which, in turn, is rigidly secured to the shaft 297 for rotation therewith. By virtue of this arrangement, the force of air compression in the dash pot acts to move the dash pot element 524 outwardly to impart to the arm 526 a sustaining action tending to rock the shaft 297 into the position which it already occupies by virtue of the elevation of the tabulator stop pawl. Accordingly, until the air compression within the dash pot is dissipated, a sustaining force is applied through the shaft 297 to maintain the tabulator stop pawl in its raised position and also to maintain the carriage rack out of engagement with the escapement mechanism. This sustaining action continues sufficiently long to permit the carriage to settle fully from its rebound action, so that by the time the biasing force of the dash pot mechanism is expanded the carriage will have assumed its accurate stop position or the tabulator stop pawl will have been partially relatched. In the rebound movement of the carriage the disengagement of the stop lug 57 from the tabulator pawl permits the pawl to relatch itself under the bias of the spring 319, so that the carriage rack remains out of engagement with the escapement mechanism. Therefore, the carriage is free to move the pawl back to unlatched position in its settling movement, whereupon the pawl is retracted through the then effective force of the carriage rack springs 322 which act to pull the carriage rack down into engagement with the escapement.

The sole support for the dash pot is derived from the pintle 525 and from the pivotal connection 521 of the dash pot stem to the rear end of the lever 517. A spring 527 connected between a point on the rocker 526 and a point on the dash pot serves to maintain the parts in proper position and thereby reduces friction of the stem 522 in its operation through the cap of the dash pot. The dash pot further is provided with a relief control valve means 528 of any suitable type by which the speed of operation may be regulated. When the bar 312 moves to the left, with respect to Fig. 2, under the action of its biasing spring 319, the forward end of the lever 517 follows behind it by the pulling action of a contractile spring 529 that is connected between the end of the lever and an appropriate point of attachment on the machine frame.

A significant feature of the invention with relation to carriage operation resides in the cooperation of the tabulator stop pawl 61 with margin stops 477 that are mounted on the phase change control shaft 53. These margin stops may be so arranged longitudinally along the shaft 53 as to define margins within margins. It is thus possible to make a selective arrangement of any desired number of margined zones within the ultimate marginal stop limits of the carriage travel. In the normally retracted position of the tabulator stop pawl, as shown in Fig. 8, its tip 61' is displaced from the path of travel of the stop lugs 57 on the indexing members, but the edge portions 311 and 311' of the pawl are disposed in the path of travel of the margin stops. By virtue of this arrangement the tabulator stop pawl is utilized to perform an additional function as a margin stop means. Whenever it is desired to pass the carriage beyond an interior margin stop point, as determined by the engagement of one of the margin stops against either the shoulder 311 or 311' of the tabulator stop pawl, the pawl may be retracted into a further and fully depressed position in which even its tip 61' is removed from the path of travel of the margin stops. This removal is accomplished by shifting the depressor bar longitudinally to its fullest extent by manipulation of the handle 496. This action lowers the depressor bar to its lowest permissible extent and, through the mechanism previously explained, carries all the conditioning elements including the tabulator stop pawl into completely lowered position where they are entirely displaced from any possibility of contact with the indexing members or the margin stops during longitudinal travel of the carriage or during rotation of the phase change control shaft in effecting a changeover of the machine from one phase of bookkeeping to another. After the carriage has passed the inner margin stop point, due to the depression of the tabulator stop pawl, the depressor bar may be returned to its original position, whereupon the tabulator pawl is permitted to re-establish itself in its normal position as shown in Fig. 8, so that it may engage a succeeding margin stop for further margin determination.

The machine conditioning elements, including the tabulator stop pawl, all have a normal range of movement incident to their normal operation in carrying out the functions of the machine. When these elements are operated under the motivating force of the depressor bar they are subjected to a movement of greater extent than that incurred in their normal operation. In every case, the component elements of the mechanism with which the conditioning elements are associated are so arranged that this further and greater movement is permissible without impairment to normal operation of the mechanism.

Although in the present disclosure the longitudinally shiftable depressor bar 484 has been illustrated and described as being mounted on the carriage, it is within the purview of this invention that the depressor bar may equally as well be disposed on some fixed portion of the machine. Its presence on the carriage is preferable from the standpoint of ready accessibility of the handle 496 with relation to the phase change control knob 55, irrespective of whatever position the carriage occupies when a phase changeover is to be made.

In summarizing the improvements incorporated by this invention, it is pointed out that the machine is equipped with a phase change control mechanism which cannot be given any operational movement whatever until every machine conditioning element that would normally be contacted by any part of the phase change mechanism during its operation has been completely removed from any possibility of such contact. Furthermore, when the machine conditioning elements have been so removed, they are held in their removed positions against any possibility of restoration to their normal positions until the phase change operation has been completed by the presentation to the conditioning elements of the selected pattern of indexing members and margin stops adapted to the particular phase of bookkeeping upon which the machine is to be engaged. In the course of operation of the carriage, the dash pot mechanism, in conjunction with the normal operating mechanism of the tabulator stop pawl, positively insures that the carriage rack cannot be re-engaged with its escapement at any point except precisely that which is determined by operation of the tabulator pawl mechanism. So long as the carriage remains even minutely displaced with respect to the predetermined stop point, it is impossible for the carriage rack to re-engage the escapement mechanism. The cooperation existing between the tabulator stop pawl and the margin stops on the carriage assembly enables any desired selective arrangement of margins within margins along the entire longitudinal extent of the carriage. The adjustability of the margin stops both longitudinally, and in positions rotated with respect to the phase change control shaft 53, makes possible a change in margin arrangement simultaneously with a change in the indexing means at each changeover of operating phase. Accordingly, both different pattern requirements incident to the various bookkeeping phases and different marginal determinations may be accomplished simultaneously and from the same operating control whenever a change of phase is effected.

Another broad aspect of the invention is that of utilization of energy derived from the carriage advancing means, or from the carriage in moving, to decelerate the rate of carriage movement in approaching a stop point that is predetermined by actuation of the tabulator stop pawl. The dash pot, acting through the tabulator stop pawl, bar 312, and lever 517, takes up the force of the carriage impact as soon as the tabulator stop pawl begins to move out of its latched engagement with the plate 59 and thus yieldingly opposes advancing movement of the carriage. It is, therefore, the power of the carriage motoring means which is, in effect, turned upon itself, to decelerate the carriage in moving to a full stop.

Although the present invention has been described in conjunction with preferred embodiment, it is to be understood that modifications and variations may be resorted to without departing from the spirit and scope of the invention, as those skilled in the art will readily understand. Such modifications and variations are considered to be within the purview and scope of the invention as claimed.

We claim:

1. In an accounting machine having different mechanisms adapted to function in the performance of diverse phases of bookkeeping, a traversing carriage, pattern arranged indexing means on the carriage, and differentially settable machine conditioning elements with portions spring biased normally into the path of travel of the indexing means for movement thereby to a set machine conditioning position; said indexing means being arranged in separate sets of different patterns, means selectively operative to present one set at a time to the machine conditioning elements, means for removing said conditioning elements bodily from possibility of contact by or against said indexing means during operation of the presenting means, and latching means normally operatively engaging said presenting means to prevent operation thereof while any of the machine conditioning elements is in other than fully removed position out of possible contact with the indexing means, said latching means being under control of said moving means and operative thereby.

2. In an accounting machine having different mechanisms adapted to function in the performance of diverse phases of bookkeeping, a traversing carriage, pattern arranged indexing means on the carriage, and differentially settable machine conditioning elements with portions spring biased normally into the path of travel of the indexing means for movement thereby to a set machine conditioning position; said indexing means being arranged in separate sets of different patterns on a control member changeable to different selective positions on the carriage to present one set of the indexing means at a time to the machine conditioning elements, means for removing said conditioning elements bodily from possibility of contact by or against said indexing means during change operation of said control member, and means operative from said removing means to prevent a position change of said presenting means while any of the machine conditioning elements is in other than fully removed position.

3. The structure of claim 2, and means for preventing restoration of removed machine conditioning elements while said presenting means occupies any intermediate position during a change.

4. In an accounting machine, a traversing carriage, a multiple control bar mounted in said carriage for turning movement to any of a plurality of predetermined positions and having a plurality of different sets of indexing means carried thereon to be operatively positioned selectively in respective ones of said predetermined positions of said control bar, machine conditioning elements shiftable between extended and retracted positions of adjustment and having members thereof biased towards extended positions of adjustment into the path of the operatively positioned set of indexing means for operation thereby during traverse of the carriage, means for displacing the machine conditioning elements to retracted position out of range of engagement by said indexing means during adjustment of the control bar to a different predetermined operating position, and means controlled by said control bar to cause said displacing means to hold said conditioning elements in said retracted position while said control bar is not in any of said predetermined positions.

5. In an accounting machine, a traversing carriage, a multiple control bar mounted in said carriage for turning movement to any of a plurality of predetermined positions and having a plurality of different sets of indexing means carried thereon to be operatively positioned selectively in respective ones of said predetermined positions of said control bar, machine conditioning elements shiftable between extended and retracted positions of adjustment and having members thereof biased towards extended position of adjustment into the path of the operatively positioned set of indexing means, latching means having an effective position for holding the control bar against turning out of any occupied one of said predetermined positions and movable to a releasing position to permit turning of said control bar, and means operable from a normal position to an operated position for shifting the machine conditioning elements to and holding them in retracted position out of range of engagement by said indexing means during turning of said control bar, said latching means and said shifting means having portions cooperating to hold said latching means against releasing movement unless said shifting means is in said operated position and to hold said shifting means in said operated position unless said control bar is in any of said predetermined positions.

6. In an accounting machine, a traversing carriage, a multiple control bar mounted in said carriage for turning movement to one of a number of operative positions and having indexing means thereon for use in diverse phases of bookkeeping, machine conditioning elements on a stationary portion of the machine shiftable between extended and retracted positions of adjustment and having members thereof biased towards extended position of adjustment into the path of the indexing means, means for engaging and moving said machine conditioning elements out of the path of the indexing means to retracted position, latching means for holding the control bar in set position, and an operative connection between the means for engaging the machine conditioning elements and the latching means for rendering the latter ineffective when the machine conditioning elements are actuated to retracted position.

7. In an accounting machine, a traversing carriage, a multiple control bar mounted in said carriage for turning movement to one of a number of operative positions and having indexing means thereon for use in diverse phases of bookkeeping, machine conditioning elements on a stationary portion of the machine shiftable between extended and retracted positions of adjustment and having members thereof biased towards extended position of adjustment into the path of the indexing means, means for engaging said machine conditioning elements in the path for movement out of the path of the indexing means to retracted position, latching means for holding the control bar in set position, and an operative connection between the means for engaging the machine conditioning elements and the latching means for rendering the latter ineffective when the machine conditioning elements are actuated to retracted position and to prevent return of the machine conditioning elements from retracted position until the control bar has been shifted to one of its operative positions.

8. In an accounting machine, a traversing carriage, a means operable to move said carriage, a multiple control bar mounted in said carriage for turning movement to any of a plurality of operative positions and having a plurality of different sets of indexing means carried thereon to be operative positioned selectively in respective ones of said positions of said control bar, machine conditioning elements shiftable between extended and retracted positions of adjustment and having members thereof biased towards extended position into the path in which the operatively positioned set of indexing means are moved by movement of the carriage, means for variably retracting the machine conditioning elements, means actuated by said carriage-moving means upon operation thereof to operate said retracting means to retract at least certain of said conditioning elements from said path, means to operate said retracting means to retract said conditioning elements out of reach of said indexing means during turning of said control bar, and means controlled by said control bar in accordance with the rotary position thereof to control said last-named operating means.

9. In an accounting machine, a traversing carriage, a multiple control bar mounted in said carriage for turning movement to any of a plurality of operative positions and having a plurality of different sets of indexing means carried thereon to be operatively positioned selectively in respective ones of said positions of said control bar, machine conditioning elements shiftable between extended and retracted positions of adjustment and having members thereof biased towards extended position into the path in which the operatively positioned set of indexing means are moved by movement of said carriage, means operable to displace the machine conditioning elements out of said path to a partially retracted position and operable to displace said conditioning elements to a fully retracted position out of range of contact by said indexing means during turning of the multiple control bar, means operable to move said carriage and to operate said displacing means to displace said conditioning elements to said partially retracted position, and latching means controlled by said displacing means and by said control bar for securing the multiple control bar in set position while the machine conditioning elements are in other than said fully retracted position and for holding said machine conditioning elements in said fully retracted position while the multiple control bar is in other than one of its operative positions of adjustment.

10. In an accounting machine, a traversing carriage, indexing means on said carriage arranged in patterns for diverse phases of bookkeeping, machine conditioning elements shiftable between extended and retracted positions of adjustment and having members thereof biased towards extended position into the path of the indexing means for operation thereby during traverse of the carriage in one direction, and means operative upon the return of the carriage towards starting position to displace the machine conditioning elements partially toward retracted position out of the path of the indexing means and other means responsive to adjustment of the accounting machine for typing operations to displace the machine conditioning elements partially towards retracted position out of the path of the indexing means, and still other means operatively engaging the machine conditioning elements to displace same to retracted position in advance of adjustment of the indexing means to a new pattern.

11. An accounting machine having a traveling carriage, a plurality of different function control program determining sets of function control indexing elements supported on said carriage for movement of said sets selectively into and out of active program determining position, program selecting means to move said sets of indexing elements selectively into and out of active program determining position, a plurality of function control members normally yieldingly positioned for indexing engagement by indexing elements of the active set in accordance with the position of the carriage, means for retracting said control members and holding them out of range of engagement by said indexing elements, and means normally holding said program selecting means against operation to move said indexing element sets and controlled by said retracting means to release said program selecting means for operation only while said retracting means holds said control members out of range of engagement by said indexing elements.

12. An accounting machine having a traveling carriage, a plurality of different function control program determining sets of function control indexing elements supported on said carriage for movement of said sets selectively into and out of active program determining position, program selecting means movable to any of a like plurality of predetermined positions ot move said sets of indexing elements selectively to active program determining position, a plurality of function control members normally yieldingly positioned for indexing engagement by indexing elements of the active set in accordance with the position of said carriage, means operable from a normal position to an operated position for retracting said control members and holding them in a retracted position out of range of engagement by said indexing elements, and means cooperating with said program selecting means and with said retracting means to hold said selecting means against movement out of any occupied one of said predetermined positions unless said retracting means is in said operated position and to hold said retracting means in said operated position against return toward said normal position unless said program selecting means occupies one of said predetermining positions.

(References on following page)

References Cited in the file of this patent

UNITED STATES PATENTS

| | | |
|---|---|---|
| 1,260,728 | Stickney | Mar. 26, 1918 |
| 1,400,842 | Vickers | Dec. 20, 1921 |
| 1,603,215 | Scherer | Oct. 12, 1926 |
| 1,800,197 | Blaisdell | Apr. 14, 1931 |
| 1,837,898 | Crumrine | Dec. 22, 1931 |
| 1,901,162 | Helmond | Mar. 14, 1933 |
| 2,002,362 | Christian | May 21, 1935 |
| 2,214,897 | Bower | Sept. 17, 1940 |
| 2,323,205 | Crosman | June 29, 1943 |
| 2,492,887 | Rainey | Dec. 27, 1949 |